June 24, 1958     S. F. FOHRMAN     2,839,928
ADJUSTABLE MEASURING DEVICE
Filed Feb. 17, 1956
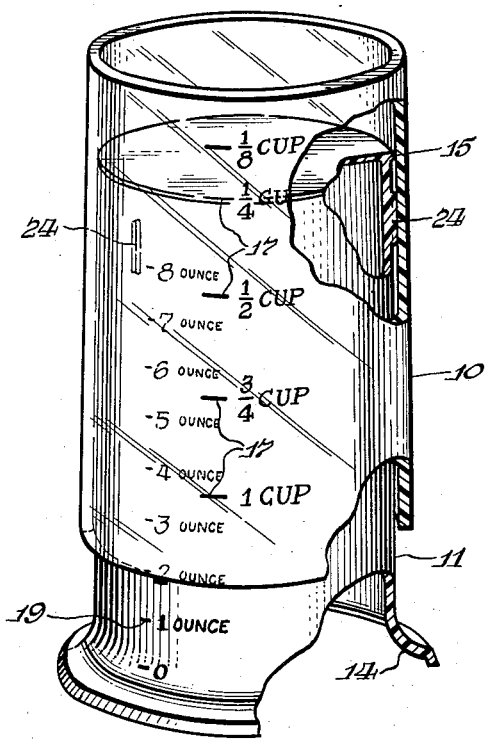
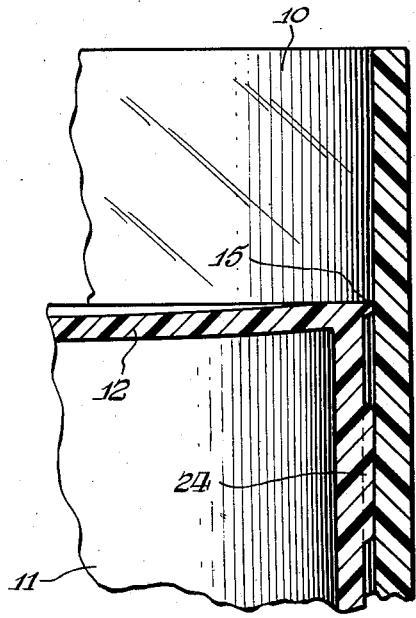
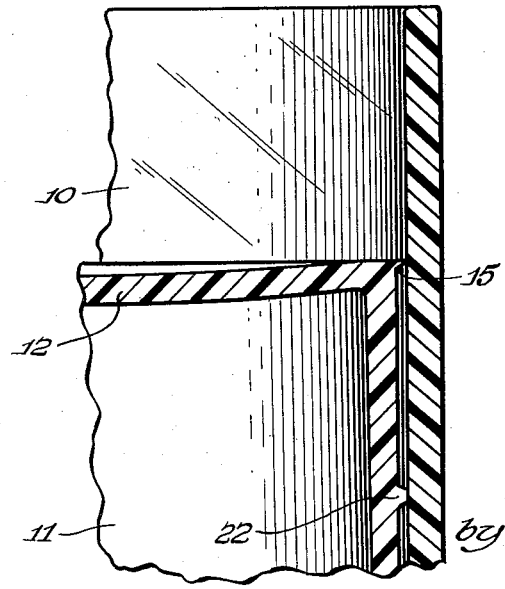
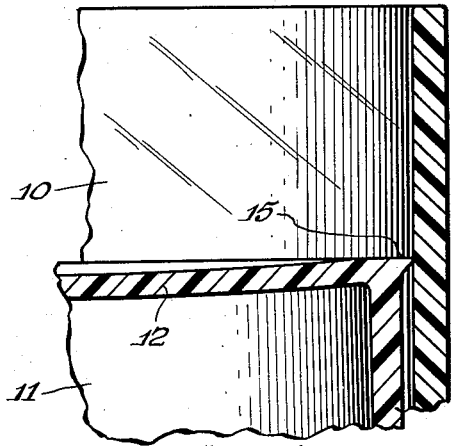
Inventor
Seymour Fohrman
by Fidler, Crouse & Beardsley
Attorneys

United States Patent Office 2,839,928
Patented June 24, 1958

2,839,928

ADJUSTABLE MEASURING DEVICE

Seymour F. Fohrman, Glencoe, Ill.

Application February 17, 1956, Serial No. 566,184

7 Claims. (Cl. 73—429)

This invention relates to improvements in adjustable measuring devices such, for example, as household measures for measurement of materials to be used in cooking, or for other purposes.

An object of the invention is to provide an adjustable measuring device which can be easily and inexpensively produced and which may be used for measurement not only of granular or powdered materials such as meals, sugar, flour, baking powder and the like, but also for other forms of materials including either thin or viscous, aqueous or oily liquids, such as milk, flavoring extract, molasses, or cooking oils, or pasty or plastic materials such as shortenings.

A further object of the invention is to provide an adjustable measuring device in which, after adjustment to the desired volume to be measured and filling with the measured quantity of materials, the adjustable parts may be operated to eject the measured material, such as butter, shortenings, molasses and the like plastic or viscous materials, and will substantially completely eject such materials to greatly facilitate rapid use of the measure for successively measuring a series of different materials.

A further object of the invention is to provide an improved adjustable measuring device which is easily and inexpensively produced of plastics which are readily cleansed in the stream of water from a tap.

A further object of the invention is to provide an adjustable measuring device of the above stated character which can be mass-produced by injection molding, preferably from inexpensive molding plastics.

The foregoing and other objects and advantages of the invention will become readily apparent from the following description of a preferred embodiment of the invention illustrated in the accompanying drawings in which:

Fig. 1 is a front elevation of an adjustable measuring device in accordance with the invention, with portions broken away to more clearly reveal its structure; and Figs. 2, 3 and 4 are sectional details showing certain modifications.

The measuring device of the present invention comprises relatively adjustable outer and inner members 10 and 11. The outer member 10 is preferably made of a relatively hard, clear, transparent plastic, such as a polystyrene resin or an arcrylic resin like that sold under the registered tramemark "Lucite," and is in the form of a sleeve which, though nearly cylindrical, has a slight interior and exterior upward taper of the order of a few thousandths of an inch or less per inch of length. The upward taper of the outer surface of the member 10 may be equal to or slightly greater than the interior upward taper, the purpose of the tapers being to facilitate production of the member 10 by injection molding, with at least the inner surface, and preferably also the outer surface, having a good finish free from parting line defects.

The inner member 11 is formed of a softer, more resilient, synthetic resin, such as one of the polyethylene molding resins, and in the form of a hollow cylinder closed at the top by a top wall 12 and open at the bottom. The flexibility of the material of which the inner member 11 is formed will permit it to be produced by injection molding without parting lines along its outer surface. However, the inner member 11 may also be formed with an outward surface having a slight upward taper equal to or less than the upward taper of the interior surface of the outer member 10 also to increase the ease of production by injection molding.

The inner member 11 which, in storage, is substantially completely inserted within the outer member 10 and, in use for measuring, is partially withdrawn therefrom, is formed around its lower end edge with an outward flange 14 which serves to protect the lower edge of the outer member, to provide a convenient and effective grip on the inner member for adjusting it relative to the outer member 10, and to provide increased stability of the device when it is resting on a supporting surface. It will be readily apparent that this flange 14 or other form of annular enlargement at the lower end of the inner member may be of various suitable forms.

At the upper end of its outer surface the inner member 11 is formed with a small annular ridge or bead 15 which provides a complete, continuous line or narrow band sealing contact between the inner and outer members at all positions of adjustment of the inner member 11 within the outer member 10 within the range of measuring capacity of the device. The diameter of the outer surface of the inner member 11 is such as to provide at least a slight clearance between such surface and the inner surface of the outer member when the inner member is fully telescoped within the outer member. The outer diameter of the bead or ridge 15 is such as to maintain the outer edge or surface of the bead 15 in good sealing pressure contact with the inner surface of the outer member 10 throughout the range of relative adjustment of the two members. The ridge or bead 15 may have various suitable cross-sectional forms such as a trapezoidal form shown in Fig. 2, the blunt V form shown in Fig. 3, the sharp V form shown in Fig. 4, or any other form which will produce the desired continuous fluid-tight contact.

With the parts formed as above described with a slight taper of the inner surface of the outer member, with a small clearance between the inner surface of the outer member, and with no greater taper of the outer surface of the inner member, the sealing ridge or bead 15 is sufficiently small to permit ready removal from the mold of the member 11 when it is formed of a relatively flexible synthetic plastic, such as a polyethylene resin.

The top wall 12 of the inner member is made with an upwardly slightly concave form to provide somewhat more radial compressibility of the upper end of the inner member than would be present if the top wall 12 were flat.

Either the inner or the outer member, or both, may have suitable measuring scale indications applied thereto as shown at 17 and 19 in Fig. 1. One or more measuring scales, such as 17, may be applied to the outer member by, for one example, hot stamping, or, for a second example, by silk screen printing which is found to be very advantageous for printing on various synthetic plastics, such as the acrylic resin of which the outer member 10 is preferably formed. In use, the inner member will be adjusted to position its upper end edge at that line of the scale 17 which corresponds to the quantity which is desired, the inner member being clearly visible through the transparent outer member 10. Alternatively, the inner member may be adjusted to position a mark of the scale 19 on the inner member at the lower edge of the outer member. A scale may also or alternatively be so applied to the inner member that the desired scale mark on the inner member may be placed behind a reference mark on the outer member to adjust the measuring device to the desired capacity.

It will be apparent that when the measuring device is adjusted for measurements at or near its maximum measuring capacity, by reason of the small clearance between the outer surface of the inner member and the inner lower edge of the outer member, the outer member can tilt slightly about the ridge or bead 15 of the inner member unless there are provisions to prevent such tilting. Although such tilting would not impair the accuracy of measurement to any significant degree in the use of the device for the measurement of materials for baking and cooking or other household purposes, it is, however, preferred to provide the improved measuring device with means for preventing or minimizing such relative tilting of the members 10 and 11. For that purpose the inner member may be formed with either a continuous or an interrupted second circumferential ridge 22 at such a height on its outer surface that it will remain within the outer member and be a little above the lower edge of the latter when the device is adjusted to or near its maximum measuring capacity. In another form, the inner member may be formed with several vertical ridges 24 which may be relatively short as shown in Fig. 2, or may be of greater length or may even extend from or adjacent the lower flange 14 to or near the sealing bead 15. Although a circumferential bead, such as 22, will not, by reason of the flexibility of the walls of the inner member, cause great difficulty in removal of the inner member from the mold during manufacture, longitudinally extending ridges, such as 24, are somewhat preferable from that standpoint.

Adjustable measuring devices as herein described and illustrated have been found to possess a number of important advantages. As above mentioned, the improved measuring device is of such a nature that it can easily and inexpensively be mass-produced by injection molding of inexpensive synthetic plastics which are very desirable, especially for household use, because of their durable and relatively unbreakable character. The improved adjustable measuring device, because of the fluid-tight seal provided by the bead 15 which is maintained in fluid-tight engagement with the inner surface of the outer member throughout the range of adjustment of the device by reason of the flexibility or radial compressibility of the inner member, may be used for the measurement of all physical forms of materials such as are required to be measured for household uses, such as cooking or baking, and including aqueous and oleaginous liquids, pastes, and plastic materials, as well as powdered and granulated solids.

The molding plastics of which the two parts are formed are also inert to either acidic or alkaline materials such as citrus juices, soda, and ammonia water, and are unaffected by water, oils, or alcoholic liquids such as flavoring extracts, and are substantially immune to denting to which metals are subject, and substantially free from chipping and breakage to which glass so readily succumbs. The frictional contact of the bead 15 against the inner surface of the outer member not only provides the desirable liquid-tight seal, but also provides adequate frictional engagement between the outer and inner members to maintain them in adjusted relative positions, and yet permits surprisingly easy insertion of the inner member within the outer member after they have been separated as for washing.

In adjusting the inner member axially relative to the outer member, it is found that the desired accurate adjustment is extremely easily obtained by effecting relative twisting or opposite turning motions to the inner and outer members while pressing the inner member either inwardly into or pulling it outwardly from the outer member. The polyethylene molding plastic of which the inner member is preferably formed has a surface character permitting very easy adjusting relative movement of the two parts.

When the measuring device has been filled with a thick, syrupy, plastic or pasty material, such as molasses, lard, or the like, the measured material is easily ejected from the measure by merely pressing the inner member into fully telescoped position within the outer member, after which any material still adhering to the measure is readily removed by passing the edge of a spatula, table knife or the like across the upper end of the device. The upward concavity of the top wall of the inner member is not so great as to produce any difficulty in such removal of the measured material. In such telescoping movement of the member for ejecting measured material, the bead 15 on the inner member substantially completely cleanses the inner surface of the outer member. In any event the molding plastics of which the inner and outer members are formed have so little adhesive affinity for either aqueous or oleaginous materials that they are, to an advantageous extent, self-cleansing. Complete cleansing of the device is normally readily effected by merely holding the device or the separated parts in the stream of water under a tap.

In inverted and preferably telescoped position, the improved device can also serve as a convenient cup or receptacle for various purposes.

It will be readily understood that the improved adjustable measuring device of the present invention is readily susceptible of various uses other than those specifically mentioned above, and that various modifications may be made in the form thereof within the scope of the appended claims.

I claim:

1. An adjustable measuring device comprising a tubular, relatively hard and rigid outer member open at both ends, and an inner substantially cylindrical, relatively softer, flexible and radially compressible, hollow, one-piece inner member telescopically adjustable within the outer member and having a closed upper end to form with the wall of the outer member a measuring cup of adjustable capacity, said inner member having also at the upper end of its outer surface an integral circumferential ridge which, in the separated relation of the inner and outer members, extends to a radial distance slightly greater than the inner radius of the outer member whereby, in the assembled relation of the parts, said ridge is pressed into sealing engagement with the wall of the outer member.

2. An adjustable measuring device comprising a nearly cylindrical, tubular, relatively hard and rigid outer member open at both ends and having internally a slight axial taper, and an inner substantially cylindrical, relatively softer, flexible and radially compressible, hollow, inner member having at least no substantially greater upward taper, telescopically adjustable within the outer member and having a closed upper end to form with the wall of the outer member a measuring cup of adjustable capacity, said inner member having also at the upper end of its outer surface an integral circumferential ridge which, in the separated relation of the inner and outer members, extends to a radial distance slightly greater than the inner radius of the lower end portion of the outer member whereby, in the assembled relation of the parts, said ridge is pressed into sealing engagement with the wall of the outer member in all relatively adjusted measuring positions of the inner and outer members.

3. An adjustable measuring device comprising a tubular outer member of substantially transparent, relatively hard molding plastic open at both ends and an inner substantially cylindrical hollow member of relatively softer and flexible molding plastic generally of slightly smaller outer radial dimension than the inner radial dimension of the outer member, telescopically adjustable within the outer member and having an integral upper end wall slightly compressible radially and closing the upper end of said inner member to form with the wall of the outer member a measuring cup of adjustable capacity, said inner member having also at the upper end of the outer surface an integral circumferential bead which, in the separated relation of the inner and outer members, extends to a radial distance slightly greater than the inner radius of the outer member whereby, in the assembled relation of the parts, said ridge is pressed into sealing engagement with the wall of the outer member.

4. An adjustable measuring device comprising a tubular, relatively hard and rigid outer member open at both ends and having a slight axial taper, and an inner substantially cylindrical, relatively softer, flexible and radially compressible, hollow, inner member having at least no substantially greater upward taper, telescopically adjustable within the outer member and having its upper end closed by an upwardly concave integral end wall which with the wall of the outer member forms a measuring cup of adjustable capacity, said inner member having also at the upper end of its outer surface an integral circumferential ridge which, in the separated relation of the inner and outer members, extends to a radial distance slightly greater than the inner radius of the lower end portion of the outer member whereby, in the assembled relation of the parts, said ridge is pressed into sealing engagement with the wall of the outer member in all relatively adjusted measuring positions of the inner and outer members.

5. An adjustable measuring device comprising a tubular outer member of substantially transparent, relatively hard molding plastic open at both ends and a one-piece inner substantially cylindrical hollow member of relatively softer, flexible and slightly compressible, molding plastic generally of slightly smaller outer radial dimension than the inner radial dimension of the outer member, telescopically adjustable within the outer member and having an integral upper end wall slightly compressible radially and closing the upper end of said inner member to form with the wall of the outer member a measuring cup of adjustable capacity, said inner member having also at the upper end of the outer surface an integral circumferential bead which, in the separated relation of the inner and outer members, extends to a radial distance slightly greater than the inner radius of the outer member whereby, in the assembled relation of the parts, said ridge is pressed into sealing engagement with the wall of the outer member, one of said inner and outer members being provided on its outer surface with measure scale markings and the other of said members having a reference feature which, when placed in opposition to any of said scale markings, indicates the measurable quantity.

6. An adjustable measuring device comprising a tubular, relatively hard and rigid outer member open at both ends, and an inner substantially cylindrical, relatively softer, flexible and radially compressible, hollow, inner member having a general radial dimension slightly less than the internal radius of the outer member, telescopically adjustable within the outer member and having a closed upper end to form with the wall of the outer member a measuring cup of adjustable capacity, said inner member having also at the upper end of its outer surface a circumferential ridge which, in the separated relation of the inner and outer members, extends to a radial distance slightly greater than the inner radius of the outer member whereby, in the assembled relation of the parts, said ridge is pressed into sealing engagement with the wall of the outer member, said inner member also having on its outer surface below said circumferential ridge at least one additional ridge positioned to engage the inner surface of the outer member to prevent relative tilting movement of the one member on the other when the members are adjusted to their larger measure relative positions.

7. An adjustable measuring device comprising a tubular, relatively hard and rigid outer member open at both ends, and an inner substantially cylindrical, relatively softer, flexible and radially compressible, hollow, inner member having a general radial dimension slightly less than the internal radius of the outer member, telescopically adjustable within the outer member and having a closed upper end to form with the wall of the outer member a measuring cup of adjustable capacity, said inner member having also at the upper end of its outer surface a circumferential ridge which, in the separated relation of the inner and outer members, extends to a radial distance slightly greater than the inner radius of the outer member whereby, in the assembled relation of the parts, said ridge is pressed into sealing engagement with the wall of the outer member, said inner member also having on its outer surface below said circumferential ridge a plurality of longitudinal ridges to engage the inner surface of the outer member to prevent relative tilting movement of the one member on the other.

References Cited in the file of this patent

UNITED STATES PATENTS

| | | |
|---|---|---|
| 153,352 | Leitzell | July 21, 1874 |
| 2,399,813 | Lucas | May 7, 1946 |
| 2,653,746 | MacDonald | Sept. 29, 1953 |